Sept. 10, 1968  J. L. LEMPKE ET AL  3,400,563
STEERING COLUMN LOCK

Filed July 31, 1967  2 Sheets-Sheet 1

JAMES L. LEMPKE
EDGAR G. TRUDEAU
INVENTORS

BY John L. Faulkner
John J. Roethel
ATTORNEYS

Sept. 10, 1968  J. L. LEMPKE ETAL  3,400,563
STEERING COLUMN LOCK

Filed July 31, 1967  2 Sheets-Sheet 2

JAMES L. LEMPKE
EDGAR G. TRUDEAU
INVENTORS

BY John R. Faulkner
John J. Boethel
ATTORNEYS 3,400,563
STEERING COLUMN LOCK
James L. Lempke, Detroit, and Edgar G. Trudeau, Birmingham, Mich., assignors to Ford Motor Company, Dearborn, Mich., a corporation of Delaware
Filed July 31, 1967, Ser. No. 657,406
5 Claims. (Cl. 70—184)

ABSTRACT OF THE DISCLOSURE

A locking mechanism mounted on a vehicle steering column to prevent turning movement of the vehicle transmission shift tube and rotation of the steering shaft. The locking action is achieved by locking detents which pass through the steering column tube and the transmission shift tube before engaging the steering shaft. The detents are cam controlled by a cam that is driven by a key operated lock cylinder device.

BACKGROUND OF THE INVENTION

In the era preceding World War II a number of automobiles were built having locking mechanisms for locking the steering shaft against turning movement relative to the supporting steering column. This was considered one way of making an automobile theft proof, since an automobile that could not be steered could not be driven away even if the engine could be started and the transmission placed in a drive condition. U.S. Patents 2,032,802, 2,100,717, and 2,314,568, which have filing dates ranging from June 1925 to October 1940, are representative of the prior art showing pre World War II locking mechanisms.

Following the resumption of automotive production after World War II, the steering locking devices were discontinued. The locking mechanisms were extra cost items. They also interfered with the transfer of the gear shift lever from the vehicle floor board to a position on the steering column.

In recent years, however, there has been a steady increase in the number of vehicles that have been used for un-authorized joy rides by juvenile deliquents or have been stolen for resale or removal of parts and accessories. Accordingly, the use of a steering gear locking device or mechanism as a deterent to those who would make unauthorized use of automobiles has again been proposed.

SUMMARY OF THE INVENTION

The invention relates to a locking mechanism for holding a vehicle transmission shift tube and a steering shaft means against turning movement within a steering column in which the shift tube and shaft means are concentrically mounted. The locking mechanism comprises a support means externally mounted on the steering column. The detent means are pivotally mounted on the support means and project through the steering column into shift tube and steering shaft means locking engagement. The support means also carries rotatable cam means in abutting relation to the detent means. The rotatable cam means is coupled to a key operated means for rotating the cam means to cam the detent means out of locking engagement with the shift tube and steering shaft means.

DESCRIPTION OF THE ILLUSTRATED EMBODIMENT

Figure 1:
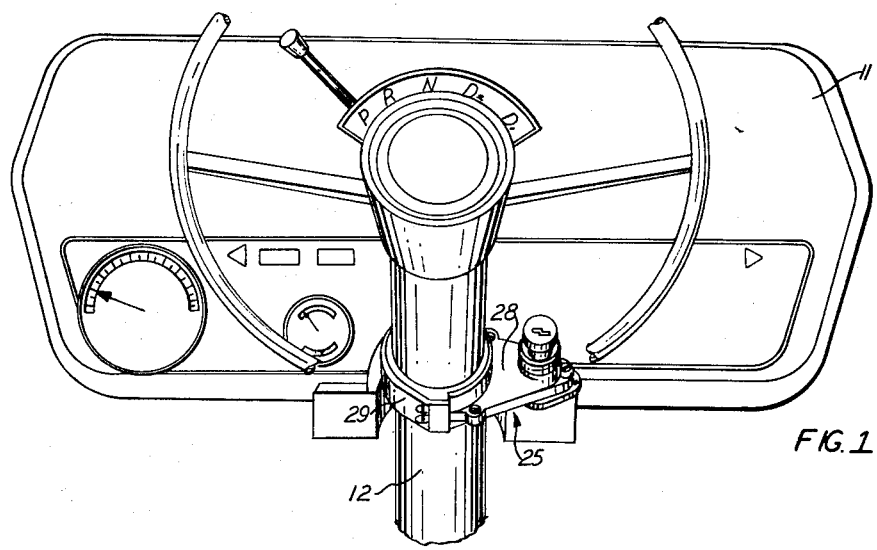
FIG. 1 is a fragmentary perspective view of an automobile instrument panel and steering column with the locking mechanism embodying the present invention mounted on the steering column.
Figure 2:
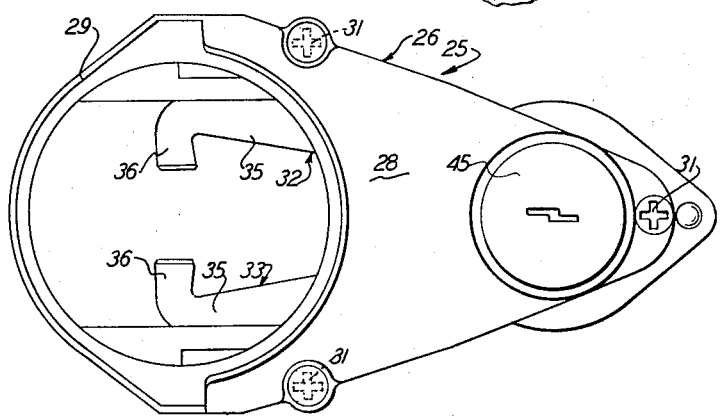
FIG. 2 is a plan view of the locking mechanism of the present invention.
Figure 4:
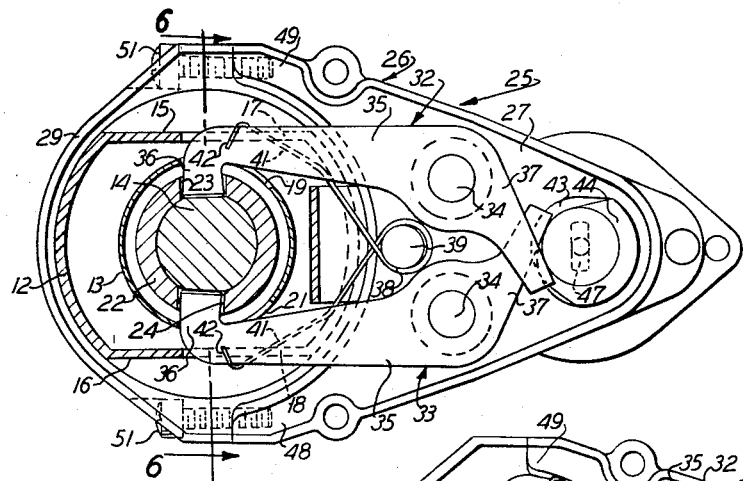
FIG. 4 is a sectional view substantially on the line 4—4 of FIG. 3.
Figure 5:
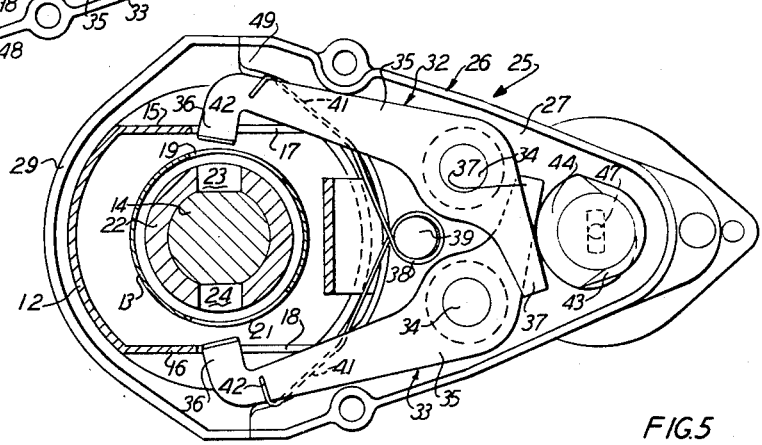
FIG. 5 is a view in part similar to FIG. 4 illustrating the mechanism in a second operative condition.
Figure 6:
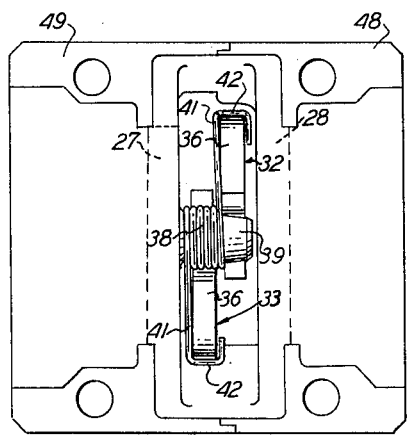
FIG. 6 is an enlarged sectional view on the line 6—6 of FIG. 4.

Referring now to the drawings, FIG. 1 illustrates a portion of a vehicle instrument panel 11 and a steering column 12. The steering column 12 is a hollow tubular member having a vehicle transmission shift tube 13 and a steering shaft 14 concentrically mounted therein. As best seen in FIGS. 4 and 5, the steering column 12 is provided with flat sides 15 and 16 which are slotted at 17 and 18, respectively. The transmission shift tube has oppositely disposed slots 19 and 21. The steering shaft 14 carries a fixed collar 22 having diametrically disposed recesses 23 and 24. The slots 17 and 18, the slots 19 and 21, and the recesses 23 and 24 are vertically aligned at all times, but are in diametrical alignment only under certain conditions, as will be more fully explained.

The locking mechanism, generally designated 25, embodying the present invention, comprises a support means or housing 26 externally clamped to the steering column 12. The housing 26 comprises three sections. These sections are a rear housing section 27, a front housing section 28 and a steering column mounting cap 29.

The front and rear housing sections 28 and 27, when fitted together and secured by bolts 31, form a shell housing a pair of detent levers 32 and 33. The detent levers 32 and 33 are journalled on spaced pivot pins 34 and are identical in shape but are mounted in inverted relationship to one another. Each detent lever 32 and 33 has an elongated arm 35 terminating in a hook 36. Each detent lever also has a short arm 37 angularly inclined relative to the longitudinal axis of the elongated arm 35.

The two detent levers 32 and 33 are mounted within the housing formed by the housing sections 28 and 27 so that they are swingable in parallel planes. The short arms 37 overlie one another and the hooks 36 are diametrically opposite one another.

The detent levers 32 and 33 are urged in counter-directions of swinging movement about their respective pivot pins 34 by a single spring 38 coiled and anchored about a pin 39 positioned between the two detent levers. The spring 38 has at each end an elongated arm 41 terminating in a hook 42 overlying the detent levers 32 and 33 adjacent the ends carrying the hooks 36. The spring 38 is preloaded so that the detent levers are respectively urged in directions to bring the hooks 36 toward each other.

Figure 3:
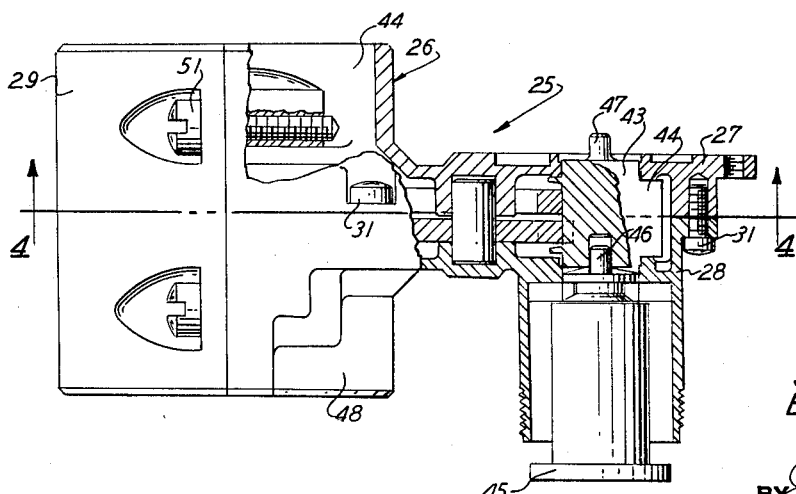
FIG. 3 is a side elevation of FIG. 2 in part sectional.

The force of the spring 38 urging the hooks 36 of the detent levers 32 and 33 toward each other is overcome by engagement of the short arms 37 by a barrel cam 43 having a cam lobe 44. As best seen in FIGS. 3 and 4, when the cam lobe 44 is at its zero degree rise position relative to the arms 37 (FIG. 3), the position of the detent levers is determined by the spring 38. When the cam lobe 44 is at its maximum rise relative to the arms 37 (FIG. 4), the detent lever hooks 36 are at their maximum separation from each other.

The cam is driven or rotated by a key operated lock cylinder 45 of any conventional type which is coupled to the cam by an extension 46 (see FIG. 3). The cam is in turn provided with a similar extension 47 through which the cam may be coupled to the vehicle ignition switch (not shown) so that the same key may be used to operate both the steering column locking mechanism and the vehicle ignition switch.

At their left ends, as viewed in the drawings, the front and rear housing sections 28 and 27, respectively, are provided with semicylindrical collar portions 48 and 49, respectively. These collar portions 48 and 49 cooperate with the column mounting cap 29 to encompass the steering column 12.

The column mounting cap is bolted as by bolts 51 to the semicylindrical collar portions 48 and 49.

Referring now to FIG. 4, the locking mechanism 25 is illustrated with its parts in position to prevent turning movement of the vehicle transmission shift tube 13 and of the steering shaft 14. That is, the hooks 36, which may hereinafter be defined as the blocking portions of the detent levers 32 and 33, project through the slots 17 and 18 in the steering column, through the slots 19 and 21 in the transmission shift tube and into the recesses 23 and 24 in the collar 22 which is fixed on the steering shaft 14. With the parts in this relationship, the vehicle transmission shift tube 13 cannot be moved and therefore the vehicle transmission cannot be placed in a drive condition. Preferably, the vehicle transmission shift tube, when in the position shown in FIG. 4, indicates that the transmission is in a parked position. Also, the steering wheel cannot be turned since the steering shaft 14 is held against rotation. Thus, the vehicle cannot be moved unless the drive wheels, usually the rear wheels, are lifted from the ground and the vehicle cannot be steered by the use of the steering wheel.

FIG. 5 represents the condition of the locking mechanism after the key cylinder device 45 has been actuated to rotate the cam 43 so that the cam lobe 44 will engage the detent lever arms 37 to swing each detent lever in a direction in which its blocking portion 36 is moved out of the recesses 23 and 24 in the collar on the steering shaft 14 and out of the path of the shift tube 13.

With the blocking portions 36 of the detent levers 32 and 33 in nonblockng position relative to the steering shaft 14 and to the transmission shift tube 13, the vehicle transmission may be operated and the vehicle may be steered. In order to render the transmission shift tube and the steering shaft immovable it is necessary to rotate the cam 43 back to the position shown in FIG. 4. If this is done when the transmission shift tube is in any position other than the park position or a position corresponding to that shown in FIGS. 4 and 5, the ends of the blocking portions 36 of the detent levers 32 and 33 will merely abut the wall of the transmission shift tube but will not have any blocking effect until the latter is moved to a parked position. When this happens, the spring 38 will urge the detent levers in counter-direction so that the respective blocking portions 36 will move toward each other. If the blocking portions 36 on each of the detent levers 32 and 33 are not in alignment with the recesses 23 and 24 on the steering shaft when they have passed through the slots 19 and 21 in the transmission shift tube, it will only be necessary to rotate the steering shaft until such alignment occurs at which time the spring 38 will force the blocking portions 36 to seat within the recesses 23 and 24.

The present invention thus provides a simple device for holding both the transmission shift tube and the steering shaft against rotation within the steering column thereby making it much more difficult for the vehicle to be moved by someone that does not have a key to the key cylinder device within his possession.

It will be understood that the invention is not to be limited to the exact construction shown and described, but that various changes and modifications may be made without departing from the spirit and scope of the invention as defined in the appended claims.

We claim:
1. A locking mechanism for holding a vehicle transmission shift tube and a steering shaft means against turning movement within a steering column in which said shift tube and shaft means are concentrically mounted,
    said locking mechanism comprising a support means externally clamped to said steering column,
    detent means pivotally mounted on said support means projecting through said steering column and through said shift tube into engagement with said steering shaft to hold the latter against turning movement,
    rotatable cam means journalled on said support means in abutting relation to said detent means,
    and key operated means coupled to said rotatable cam means for rotating the latter to cam the detent means out of locking engagement with said shift tube and steering shaft means.

2. A locking mechanism according to claim 1, in which:
    the detent means comprises a pair of members having diametrically opposed blocking portions,
    spring means normally urging said blocking portions towards each other,
    and apertures in the shift tube alignable with recesses on the steering shaft means to receive said blocking portions for locking the shift tube and steering shaft means to the steering column.

3. A locking mechanism according to claim 2, in which:
    the rotatable cam means has an extension adapted to be coupled to an automobile ignition switch,
    and a cam lobe on said rotatable cam means,
    said cam lobe in a predetermined rotated position of said cam means being ineffective to cam the detent means out of locking engagement with the shift tube and steering shaft means.

4. A locking mechanism according to claim 1, in which:
    the rotatable cam means has a cam lobe thereon,
    said cam lobe in a predetermined rotated position of the cam means being ineffective to cam the detent means out of locking engagement with the shift tube and steering shaft means.

5. A locking mechanism for holding a vehicle transmission shift tube and a steering shaft means against turning movement within the steering column in which said shift tube and shaft means are concentrically mounted,
    said locking means comprising a support means exteriorly mounted on said steering column,
    a pair of detent levers pivotally mounted on said support member,
    said detent levers having diametrically opposed locking portions,
    spring means urging said detent levers in counter swinging directions relative to one another and thereby said blocking portions toward each other,
    said shift tube and steering shaft means having blocking portions receivable means engageable by said blocking portions for holding the shift tube and steering shaft means against turning movement within the steering column,
    rotatable cam means journalled on said support means in opposed relation to cam follower arms on said detent levers,
    and key operated means coupled to said rotatable cam means for rotating the latter to cam the detent levers in a direction to retract said blocking portions from engagement with said shift tube and steering column.

References Cited
FOREIGN PATENTS
337,444  10/1930  Great Britain.

MARVIN A. CHAMPION, *Primary Examiner.*
W. L. WOLFE, *Assistant Examiner.*